UNITED STATES PATENT OFFICE.

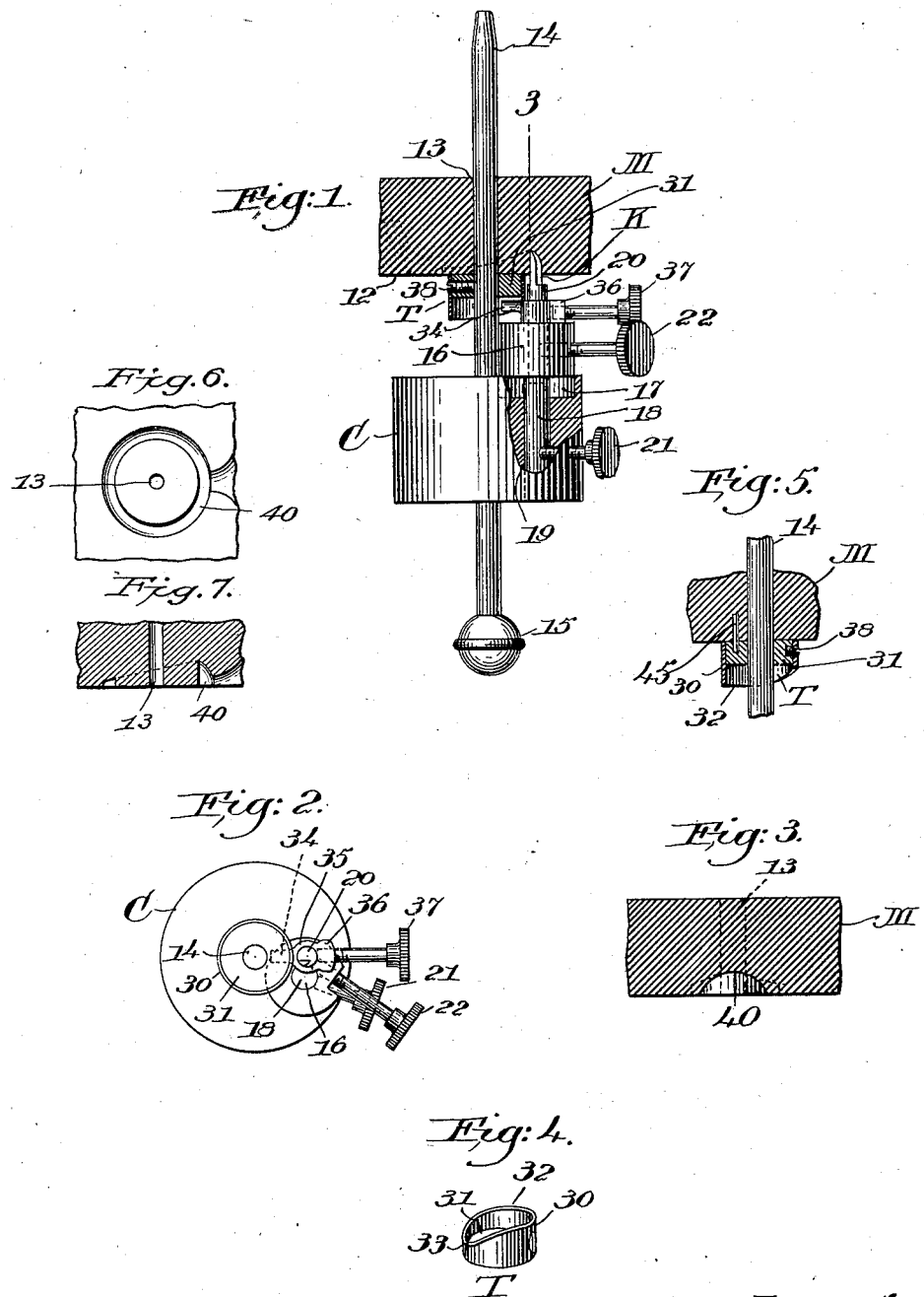

WILLIAM H. FORD, OF LOWELL, MASSACHUSETTS, ASSIGNOR OF ONE-HALF TO CYRUS W. RUSSELL, OF SAME PLACE.

MOLD-CUTTER.

SPECIFICATION forming part of Letters Patent No. 663,019, dated December 4, 1900.

Application filed August 26, 1899. Serial No. 728,566. (No model.)

*To all whom it may concern:*

Be it known that I, WILLIAM H. FORD, a citizen of the United States, and a resident of Lowell, in the county of Middlesex and State of Massachusetts, have invented an Improvement in Mold-Cutters, of which the following description, in connection with the accompanying drawings, is a specification, like characters on the drawings representing like parts.

This invention relates to an apparatus for forming molds for casting, and it is especially adapted for forming mold-spaces of differential sizes during the cutting operation, so that the object cast will be of greater sectional area at one place than at another, and while it is of advantage in a variety of arts it is of peculiar importance as an adjunct in casting finger-rings, it being well known that where the latter have jewels or settings they are heavier at the back, and in these heavier portions the seats for the jewels or settings are formed.

My invention includes a body portion provided with a cutter or tool having an orbital movement with relation to the mold material in which the mold-space is to be cut and means herein designated as a "templet" to change the relative position of the cutter and the mold material that the depth of the mold-space may be varied during the cutting operation. The templet, the body, and the cutter or tool may be of any character capable of forming a mold-space to receive molten metal for the production of a casting corresponding in shape with the said mold-space. The templet herein shown consists of a core having preferably a detachable ring having a cam-shaped end. The ring is detachably secured to the core, so that a ring of any desired shape at its cam edge may be substituted according to the variation desired in the width of the ring to be cast between its narrowest and widest parts. The mold material during the operation of cutting the mold-space therein will preferably contact with the templet, and the templet and the mold material may be united to thereby retain the mold material during the cutting of the mold-space in exactly the same relation to the templet, one means which may be employed for this purpose being a stem or projection carried by the templet. The templet herein shown as contacting with the mold material presents a cylindrical cam-shaped edge surrounding the centering pin or device supporting the mold material, the said cam edge resting upon a templet-support represented as extending from the shank of the cutter or tool employed to cut the mold-space, said cutter being mounted in a tool-carrier made adjustable in the body of the mold-cutter. The cutter or tool is made adjustable toward and from the axial center of the body to insure the cutting of an annular mold-space of the diameter desired for the ring to be cast, to thereby give to it the required finger size. The movement of the templet over the templet-support causes the mold material to approach and recede from the tool-carrier in each orbital movement of the cutter or tool with the body, and consequently the cutter or tool cuts an annular groove or mold-space of varying depth, the depth being more or less, as desired, according to the templet used, the templet being made interchangeable to provide for any variation in width of the ring to be cast.

In the drawings, Figure 1 is a sectional elevation of a mold-cutting apparatus constructed in accordance with my invention in a simple embodiment thereof and showing the work or stock in place to be operated upon. Fig. 2 is a view of the apparatus as seen from the top in Fig. 1. Fig. 3 is a transverse sectional elevation through the mold material, the section being taken in the line 3, Fig. 1, and looking toward the left. Fig. 4 is a perspective and inverted view of the depth-regulator. Fig. 5 is a detail in section, showing a modified type of templet. Fig. 6 shows a face view of one-half of a mold having a mold-space made by the mold-cutter herein to be described. Fig. 7 is a section in the line 1 of Fig. 6.

In another application, Serial No. 8,121, filed on the 10th day of March, 1900, I have shown and described a mold-cutter for cutting an annular mold-space of uniform depth instead of for cutting, as provided for in the invention herein contained, a mold-space of varying depth.

As previously stated, the apparatus is of peculiar importance as an aid in casting finger-rings.

A finger-ring mold is generally made in two substantially like parts or halves, and in the adjacent faces of the same grooves of suitable nature are formed, said grooves being adapted to register to form a mold-space in which the molten metal is poured, and the core which defines the finger size in the ring may either constitute a part of the mold material or it may be made separate therefrom. Herein instead of making the grooves in the mold material of uniform depth I make the groove in each half of the mold material of varying depth, so that one portion of the casting, as a ring, cast in the mold-space may be wider than another portion thereof, the wider portion constituting that part of the ring or casting which may receive a diamond or other jewel.

The mold-cutter herein to be described and claimed includes in its organization a body portion which may be of any suitable character, but which is herein represented as consisting of the rotatable cylinder C, carrying a cutter or tool, to be hereinafter more particularly described, the cutter or tool having an orbital movement with the body and cutting in the mold material a mold-space varying in depth, while the material is suitably sustained in position to be operated upon by the cutter or tool.

The mold material is designated by M, and it may be of charcoal, soapstone, or any substance which can be advantageously acted upon by a cutter.

Prior to the operation of the cutter or tool to cut the mold-space in the mold material said material is cut or dressed to present a plain or smooth face 12, which is bored to provide a centering-opening 13, said opening being perpendicular or at right angles to said face, as clearly shown in Fig. 1, the said opening being adapted to receive the centering device, represented as a spindle or pin 14.

The mold material M in the present case is supported by the centering device occupying a position at the center of rotation of the body portion, the centering device being represented as entering the opening 2 in the body portion C, so that the mold material can be grasped by the hand of the operator while the cylindrical body portion C is rotated, so that the cutter or tool, supported by a suitable tool-carrier held in the body in its orbital movement, cuts the mold-space in the face of the material. During this operation it will be evident that the spindle or pin 14 serves not only as a proper center, but as a support for the mold material and a pivot upon which the body portion can turn.

The centering spindle or pin is made comparatively long, and it has at one end the knob or enlargement 15, by which it can be more easily manipulated to pass it through the central bores in the body portion or carrier C and the mold material M, respectively.

The body portion or carrier C sustains a tool-carrier 16, represented as cylindrical, it being provided with a centrally-fixed stem 18, disposed in parallelism with the centering device 14, said stem entering a bore 19 in the body, the tool-carrier being fixed in any adjusted position by means of a suitable set-screw 21.

The cutter, hereinafter more particularly described, is mounted upon the tool-carrier, so that by turning the carrier the cutter can be moved toward or from the axis of rotation of the body and the centering device, the nearer the cutter to the centering device the smaller the diameter of the mold-space which will be cut by the cutter, and vice versa.

The cutter is denoted by K, and it may be of any suitable character or form, its shank 20 being fitted in an opening or seat formed in the tool-carrier 16, eccentrically to the axis of rotation thereof, and its lower end being adapted in certain adjustments thereof to extend into the socket 17. The cutter K, it will be remembered, is fixed relatively to a tool-carrier so that by turning the carrier in the body portion the cutter or the working portion thereof can be brought nearer to or farther from the axis of the centering device, spindle, or pin, that it may act to cut grooves of different diameters. The shank of the cutter K is also adjustable, it being movable in the direction of its length and parallel to the axis of the spindle 14 and being held in an adjusted position by the set-screw 22, adapted to act against the same.

My invention includes as one of its features a body portion, a cutter connected with the body portion, and means for cutting a mold-space varying in depth, and in the present case this peculiar action is obtained by a templet which may be of any suitable character.

The templet illustrated is denoted by T, and it is of such a construction as to cause the working portion or cutting edge of the cutter K to form a groove the depth of which varies in accordance with the contour of the working face of said templet. The templet represented consists of a ring 30 and a core or disk 31, removably fitted thereto, the upper faces of the two parts being flat and flush, as represented in Fig. 1, to sustain the face of the mold material during the operation of cutting the mold-space of varying depth. The templet is centrally bored to receive the spindle 14, and it is shown disposed between the mold material and the body portion C of the apparatus.

The working face 32 presents a cam-contour having a depression 33, the purpose of which will be hereinafter apparent. Said working face is adapted to coöperate with the relatively-fixed projection or finger 34, extending laterally from the hub of the templet-support 35, which is adapted to encircle the shank of the cutter and to be turned thereon, so that the projection can be moved to a position substantially radial to the templet throughout the different adjustments. The templet-support 35 has an enlargement or offset 36 extending in a direction therefrom opposite to that of the projection 34 and which forms a seat or support for the set-screw 37, which is adapted to bind against the shank of the cutter, thereby to hold the templet-support 35, and consequently the projection 34 thereof, in a desired adjusted position.

The templet and the mold material in the present case are adapted to rotate with the spindle 14, supported by the body portion or carrier C, and while the mold material is held against movement relatively to the spindle 14 simply by being snugly fitted thereto I provide a positive device for securing the templet in a fixed and adjusted position, the set-screw 38, carried thereby, being represented for this purpose, and the end of the same is adapted to firmly fit against the spindle.

By loosening the screw the templet can be readily turned to adjust the same, thereby to accurately position the place at which the deep portion of the cut is to be made.

The templet illustrated is for cutting a groove of increasing depth at a certain place; but it will be evident that to cut a deeper or shallower groove or one of a different kind a different templet than that illustrated must be used.

The cutter being held at a fixed parallel position relatively to the centering-spindle 14 will be caused in its orbital movement about said spindle to form a groove in the mold material.

Preparatory to cutting a mold-space the cutter K will be adjusted properly with relation to the longitudinal center of the rotatable body C to provide for making a mold-space of the desired diameter to provide for casting a ring of the desired finger size, and thereafter the templet will be applied to the centering device, and the lower end of the templet at its widest portion will be put against the templet-support, and the support will then be adjusted to put the end of the blade or cutter distant from the smooth face of the templet equal to one-half of the depth of the narrowest part of the ring to be cast in the mold-space to be made, and then the templet-support will be fixed in its adjusted position by tightening the set-screw 37, and thereafter the mold material will be put upon the centering device, the face of the mold material contacting with the flat face of the templet or its core, and therefore in the rotation of the body portion, by reason of the templet traveling on the templet-support, the face of the mold material is made to approach and recede from the face of the tool-carrier or the body portion during each orbital movement of the cutter, the cutter acting to cut the groove to form the mold-space of varying depth, the variation being controlled by the difference in width between the narrowest and the widest part of the templet. The varying depth of the groove or mold-space is represented best in Fig. 7.

The templet T is in two parts—the core or body portion 31 and the ring 30—removably secured together by means of the screw 38, said screw serving also to secure the templet as a whole to the spindle 14. By removing the screw 38 the ring or pattern portion 30 of the templet can be slipped off the disk or core 31 and one of a different shape substituted, and when this is done the screw 38 can be inserted to unite the two parts.

In Fig. 5 I have shown a templet equipped with means for fixedly securing the mold-material M thereto. The templet shown in this figure includes, of course, the core or body portion 31 and the removable pattern-ring 30, but the screw 38, which unites the two parts, does not bear against the spindle 14.

In Figs. 1 and 4 the templet T is shown as being secured to the spindle 14 by means of the screw 38, and the mold material fits snugly upon said spindle, so that the two parts can turn as one. In Fig. 5 I have shown a different means for securing this result. The screw 38 is not relied upon to secure the templet to the spindle, but is simply employed to detachably unite the two parts of said templet.

The body portion or core of the templet is shown equipped with a pin 45. When the templet is placed upon the spindle 14, the latter will afterward be thrust through the central bore in the mold material and the two parts may be freely fitted on said spindle. The pin 45 will be thrust into the mold material so that the two parts will be connected thereby and will move in unison.

It will be evident from the preceding description that my improved device comprises a templet having a cam-face and means for holding the templet and work in coaxial relation and a cutter controlled by the templet, and the templet, the mold material, and the body portion, to which the cutter is connected, are shown as sustained by the spindle P, whereby all three of these parts will be maintained in the disposition specified, and it also includes a cutter, means for supporting said cutter for orbital movement and for movement in a direction transverse to such orbital movement, and a templet to automatically control the cutter.

The invention of course is not limited to the precise details of construction previously described, for these may be materially modified within the scope of the appended claims.

I have shown and claim, broadly, in application Serial. No. 8,121 mold-cutting means substantially as herein described, it being represented therein as adapted to cut mold-grooves of uniform depth, the claims in this present application being based on the apparatus of said application for use with a templet and other parts to cut grooves varying in depth.

Having described my invention, what I claim, and desire to secure by Letters Patent, is—

1. In a mold-cutter, a cutting-tool standing in a line parallel with the center of rotation of the cutter-body, means to hold and center the material to be provided at its face with a circular mold-cavity, and a cylindrical templet having a cam-shaped end to define the position of the cutter and mold material with relation each to the other in accordance with the shape of the cam at the end of the templet to thereby enable the tool to cut into the face of the material a groove varying in depth to constitute part of a mold-space to enable the casting in said space of a ring varying in width.

2. In an apparatus for cutting mold-grooves of varying depth, a body carrying a tool to cut a groove in mold material, a centering-pin to center and guide the mold material to be cut, a templet interposed between said body and the mold material and occupying a central position with relation to the orbit of the tool and presenting a cam-face to control the extent of movement of the face of the material toward the body holding the cutter to thereby enable said cutter to cut a mold-groove of varying depth.

3. In a mold-cutter, a rotatable body portion, a cutter connected therewith and extended therefrom in a line parallel to the axis of rotation of said body, a centering device to center the mold material with relation to the center of rotation of the body, and a templet having a cam-face and having a common center with the mold material and body, the relative rotation of the body and material enabling the cutting by the tool of a circular groove of varying depth.

4. In a mold-cutter, a circular depth-regulating templet having at one side a cam-face and adapted to be seated at its other side upon the mold material, a body, a cutter mounted to project therefrom and to attack the mold material outside the part of the mold material with which the templet contacts, and a templet-support meeting the cam-face of the templet whereby by rotation of the body or material a circular groove of varying depth may be cut in the face of the mold material.

5. In a mold-cutter, a templet having a cam end, a cutter controlled by the templet, a body portion to which the cutter is connected, and means for supporting the body portion, the templet, and the mold material to be operated upon, in coaxial relation the templet occupying a position between the body of the cutter and the mold material.

6. In a mold-cutter, a rotatable body portion, a tool-holder supported thereby and having a cutter or tool mounted eccentrically thereon, means for confining the tool-holder in an adjusted position, means for adjusting the cutter or tool independently of the holder, a templet having a cam-shaped end, and a templet-support coöperating with the cam-face of the templet.

7. In an apparatus for cutting molds, a body portion, a centering device to center the mold material, a mold-cutter carried by the body portion and parallel with the longitudinal axis of the centering device, a templet guided by the centering device and movable longitudinally of the axis of said centering device during the operation of cutting a mold-space, the mold material moving with the templet in its longitudinal motion, whereby the cutter is made to cut a groove of irregular depth.

8. In a mold-cutter, a body portion having a spindle, a templet centered by the spindle and presenting a cam-face, a cutter disposed in parallelism to the spindle and a fixed projection coöperating with the cutter and located to travel in contact with the cam-face of the templet.

9. In a mold-cutter, a body portion, a spindle carried thereby and adapted to support the mold material, a circular templet having a cam end, and supported by the spindle between the mold material and the body portion, a post upon the body portion provided with a cutter, and a projection coöperating with the cutter and located to engage the working face of the templet.

10. In a mold-cutter, a templet having a surface to regulate the depth of cut to be made into the face of the mold material, a cutter, a hub encircling the shank of the cutter and having a projecting portion to engage the said depth-regulating surface of the templet, and means for supporting the templet and the cutter.

11. In an apparatus for cutting molds, a body portion, a centering device to center the mold material, a mold-cutter carried by the body portion and occupying a position parallel with the longitudinal axis of the centering device, and a templet rotative with the mold material during the action of the cutter in cutting the mold-space, and means coöperative with the cutter for bearing against the working face of the templet, whereby the mold material is moved longitudinally of its axis of rotation during the cutting of the mold-space, to thereby vary the depth of said space.

12. In a mold-cutter, a templet comprising a core and a wall detachably connected therewith and presenting a cam-shaped end.

13. In a mold-cutter, a templet comprising a core and a ring detachably connected to the core, said ring varying in width and presenting at its acting face a cam-surface.

14. In a mold-cutter, the combination with a cutting-tool, of a templet comprising a core and a ring having a cam-face, one of the parts having a pin to enter the mold material.

15. In a mold-cutter, a cutter-body having a longitudinal opening, a tool movable with said body, a centering-pin adapted to enter the longitudinal opening of said body loosely, a templet connected with said centering-pin, and a templet-support to sustain said templet in the longitudinal movement of the pin during the rotation of the tool-carrier.

In testimony whereof I have signed my name to this specification in the presence of two subscribing witnesses.

WILLIAM H. FORD.

Witnesses:
HEATH SUTHERLAND,
JOHN C. EDWARDS.